United States Patent
Ferris et al.

(10) Patent No.: US 6,289,726 B1
(45) Date of Patent: Sep. 18, 2001

(54) FUEL FILTER GAUGE

(75) Inventors: Gregory Matthew Ferris, Cedar Falls; Jerry Lee Manross, Waverly; Charels Henry Berry, III, Cedar Falls; Michael Dean Metcalf; Laverne Lee Sidler, both of Waterloo, all of IA (US)

(73) Assignee: Engineered Products Co., Waterloo, IA (US)

( * ) Notice: Subject to any disclaimer, the term of this patent is extended or adjusted under 35 U.S.C. 154(b) by 0 days.

(21) Appl. No.: 09/340,490

(22) Filed: Jun. 30, 1999

(51) Int. Cl.[7] ............................ B01D 35/14; G01L 7/08
(52) U.S. Cl. .................. 73/118.1; 116/266; 116/276; 73/715
(58) Field of Search ........................... 73/118.1, 700, 73/709, 713, 714, 715, 744; 116/264, 266, 276

(56) References Cited

U.S. PATENT DOCUMENTS

| | | |
|---|---|---|
| 2,946,222 | 7/1960 | Husjack . |
| 3,066,527 | * 12/1962 | Stein ................................. 73/118.1 |
| 3,556,043 | * 1/1971 | Vayda . |
| 3,594,745 | 7/1971 | Nickels . |
| 3,654,414 | 4/1972 | Kudlaty . |
| 3,696,666 | 10/1972 | Johnson et al. . |
| 3,939,457 | 2/1976 | Nelson . |
| 4,033,733 | 7/1977 | Nelson . |
| 4,171,962 | 10/1979 | Kippel et al. . |
| 4,183,029 | 1/1980 | Isayama et al. . |
| 4,279,162 | 7/1981 | Neill et al. . |
| 4,369,728 | 1/1983 | Nelson . |
| 4,423,751 | 1/1984 | Roettgen . |
| 4,445,456 | 5/1984 | Nelson . |
| 4,937,557 | 6/1990 | Tucci et al. . |
| 5,092,177 | 3/1992 | Varacca . |
| 5,239,861 | 8/1993 | Fujita et al. . |
| 5,315,875 | 5/1994 | Benedikt et al. . |
| 5,477,731 | 12/1995 | Mouton . |
| 5,774,056 | 6/1998 | Berry, III et al. . |

* cited by examiner

*Primary Examiner*—Eric S. McCall
(74) *Attorney, Agent, or Firm*—Oppenheimer Wolff & Donnelly LLP

(57) ABSTRACT

A fuel filter restriction indicating device communicating with the supply of fuel passing from a fuel tank to an internal combustion engine. The indicating device senses a decrease in the supply of fuel drawn through the fuel filter by the engine based upon changes in the amount of vacuum in the negative side of the fuel supply, the amount of restriction being indicated by the movement of an indicating device. A mechanism included in the indicating device senses the movement of the indicating device and progressively locks the indicating device into various indicating positions as the vacuum increases due to an increased restriction of the filter, so that the maximum reading of restriction achieved during engine operation remains visible to the operator or maintenance personnel even after the engine is turned off.

12 Claims, 5 Drawing Sheets

FUEL FILTER GAUGE

BACKGROUND OF THE INVENTION

The present invention relates generally to a mechanical filter gauge for determining the filtering capability of a vehicle filter, and in particular to a mechanical gauge for measuring and displaying the functionality of a vehicle's fuel filter.

The improved device of the present invention is used in connection with a fuel filter for internal combustion engines. It is particularly useful for application to trucks, particularly fleet trucks where a reduction in fuel filter changes can lead to significant cost savings. Formerly, to save costs, preexisting air filter gauges, such as those disclosed in U.S. Pat. Nos. 4,369,728 and 4,445,456, were modified to serve as fuel filter gauges, in order to minimize tooling costs and to utilize familiar technology. However, these gauges proved relatively costly, due to the materials needed to withstand fuels.

Prior art fuel filter gauges are also larger than necessary. The vacuum range of a plugged fuel filter is about five times higher than for an air filter. This translates into piston forces which are five times higher in the larger size prior art fuel gauge. The additional requirement of handling 20 psi back pressure creates excessive forces in the existing gauge causing damage.

Prior art fuel filter gauges also required felt filters in the base in the area of the reset button. However, these felt filters can be inadvertently mispositioned, resulting in leaks. The felt filters could also leak and freeze if the fuel filter gauge was mounted with the push button reset gauge in an upward position.

Certain fuel systems include two fuel filters, thereby requiring two fuel filter gauges. These systems have the first filter located prior to a ten psi electric in-line fuel pump, for example, with the second filter positioned between this electric pump and the engine driven pump located adjacent to the engine. The fuel filter gauge located after the first filter but before the first pump will be exposed to suction vacuum only, typically up to 10 in.Hg as the first filter plugs. The second fuel filter gauge attached to the fuel system after the second fuel filter will be exposed to pressure up to 10 psi or the pressure level the in-line electric pump is capable of producing. The second gauge will eventually respond to vacuum created by the engine driven pump when filter restriction due to plugging is great enough to block flow from the in-line pump. Thus the fuel filter gauges must withstand both pressure and vacuum, which has proven problematic for prior art fuel filter gauges. Back pressure can occur in two pump fuel systems and during initial pressurization testing for leaks in the fuel system at the assembly plant. The lock pin mechanism of prior art fuel filter gauges had difficulty withstanding the back pressure force and the prior art diaphragm could reverse fold against the edges of the metal diaphragm retainer causing a cut therefrom and a resulting leak.

A gauge of this type preferably indicates the condition of the fuel filter and locks itself in position, permitting determination of the condition of the fuel gauge even when the vehicle engine is not running. In the prior art, however, lock pin forces were concentrated at points that were prone to overload, distortion and breakage at high operating temperatures.

Additionally, prior art indicators have not always been easy to fully reset, due in part to poor leverage, high lock force, and high reset spring force, sometimes resulting in a gauge that may give a false, premature signal that a filter requires replacement. This may in turn result in unnecessary filter maintenance.

The fuel filter gauge of the present invention overcomes difficulties described above and affords other features and advantages heretofore not available.

SUMMARY OF THE INVENTION

The fuel filter gauge of the present invention indicates when the fuel filter of an internal combustion engine requires replacement by measuring the performance of the filter by measuring the vacuum in the fuel system of the vehicle. The device gives a gradual reading from a clean filter condition to a dirty filter condition and automatically locks into the highest clogged fuel flow condition experienced during engine operation so that it may be read after shutdown and may also be monitored during engine operation.

An object of the invention is to provide a gauge for indicating that a fuel filter for a vehicle with an internal combustion engine requires replacement. It is a further object of this invention to provide such a gauge that is reliable over a long period of time despite constant exposure to engine fuel.

It is a further object of the invention to provide such a gauge that is relatively smaller in size, thereby reducing material costs. Reduction in size also results in a smaller diameter diaphragm which greatly reduces the piston effective area and the associated calibration spring force by the square of the diameter.

It is a further object of the invention to provide such a gauge that is easily reset after each filter change. It is a further object that this fuel filter gauge be relatively small in size, and made of relatively inexpensive materials to minimize manufacturing costs. It is an important operating objective of this invention that the fuel filter gauge be capable of handling at least 20 psi back pressure.

It is a further object of the invention that a breather filter design be employed that eliminates the need for a felt filter. It is also an object of the invention that the fuel filter gauge be positionable with the push button reset switch in an upward position without risk of damage from outside contaminants entering the lock mechanism of the fuel filter gauge.

It is yet a further object of the invention that the fuel filter gauge be capable of locking itself in position when the engine is turned off, indicating the status of the fuel filter even after the engine has stopped running. An additional objective of this invention is to provide a fuel filter gauge that is easy to reset when a used filter has been replaced.

It is yet a further object of this invention to provide a fuel filter gauge capable of withstanding both pressure and vacuum forces. It is also an object that the internal locking mechanism and diaphragm assembly of the gauge must be able to withstand the pressure reversals and forces encountered in the fuel system.

Other objects and advantages of the invention will become apparent from the following detailed description and from the appended drawings in which like numbers have been used to describe like parts throughout the several views.

DETAILED DESCRIPTION OF PREFERRED EMBODIMENTS

Figure 1:
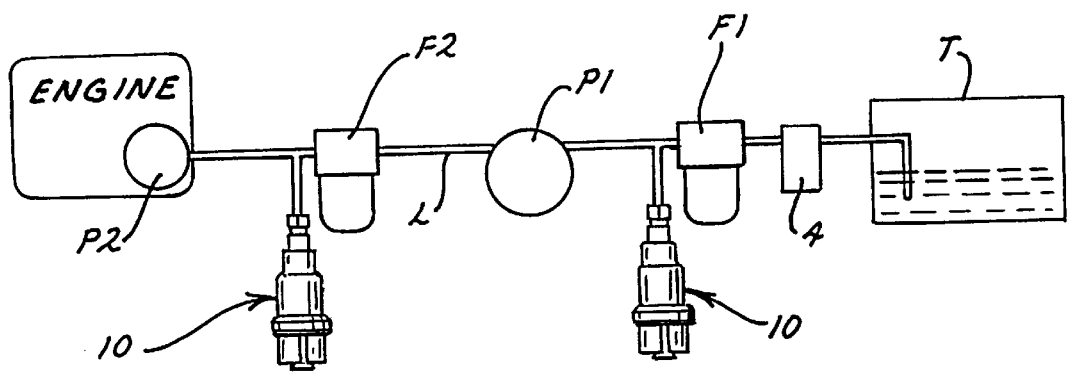
FIG. 1 is a schematic view of a fuel intake system for an internal combustion engine incorporating the fuel filter gauge of the present invention.
Figure 2:
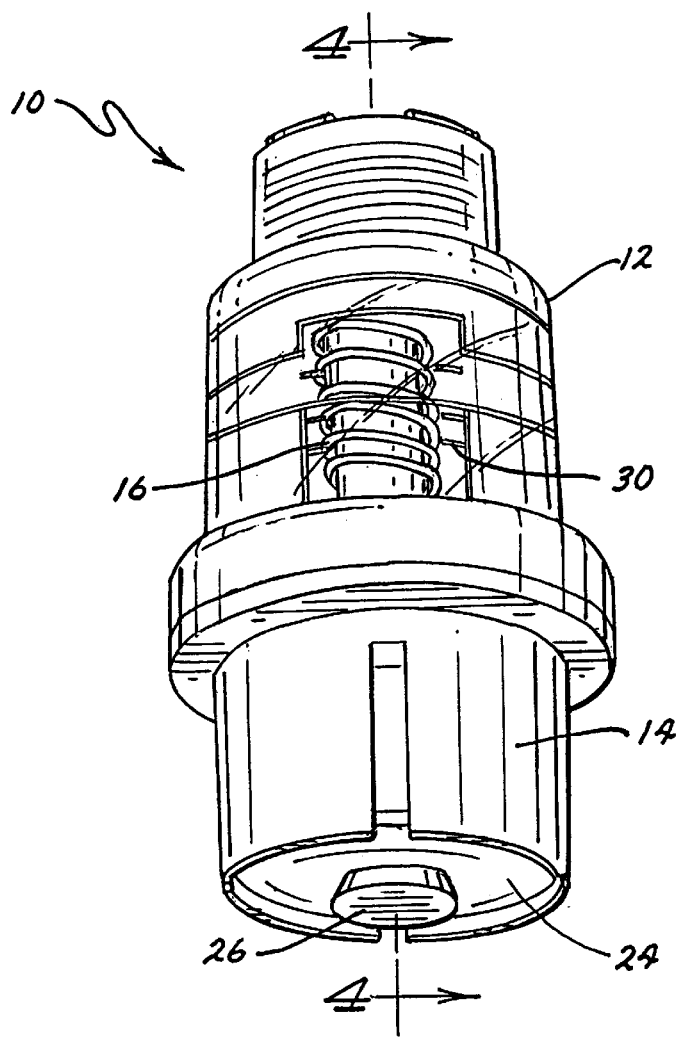
FIG. 2 is a perspective view of the fuel filter gauge of the present invention.
Figure 3:
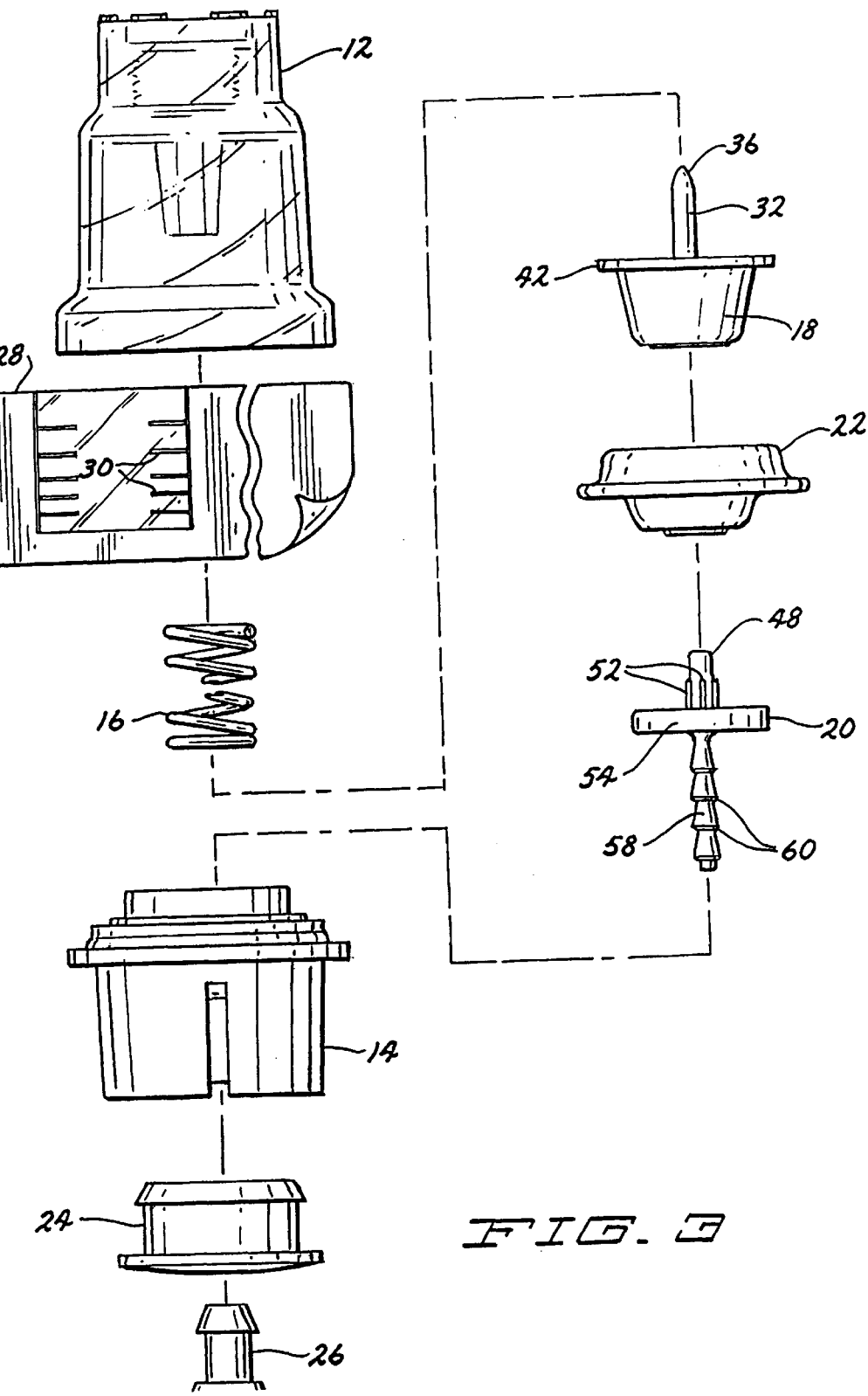
FIG. 3 is an exploded view of the indicating device illustrated in FIG. 2.

With reference to the drawings, and in particular to FIGS. 1 and 2, the fuel filter gauge is generally indicated by reference numeral 10. As shown schematically in FIG. 1, in a typical fuel system, including a water separator filter F1 and a main fuel filter F2, it is preferable to include two fuel filter gauges 10. The fuel system also preferably includes fuel tank T, fuel heater H, a 10 psi electric in-line fuel pump P1, and an engine having a fuel pump P2 driven thereby. Fuel travels through a fuel line L from fuel tank T to the engine.

Figure 4:
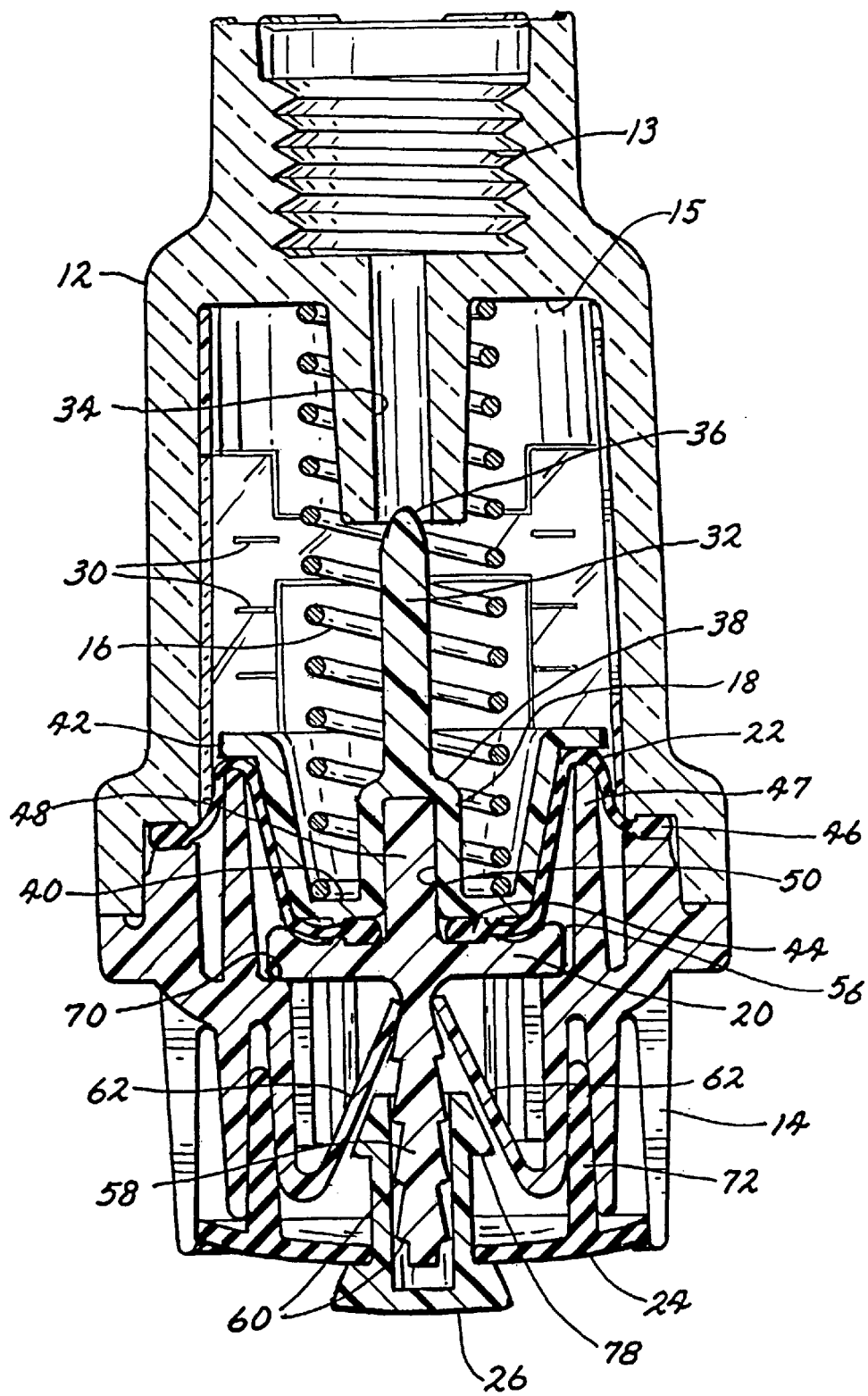
FIG. 4 is a vertical section view of the indicating device taken along line 4—4 of FIG. 2.

Fuel filter gauge 10 includes a preferably transparent housing 12, a base cap 14, a calibration spring 16 and an indicator cup 18, a preferably generally cup-shaped member. Housing 12 is preferably sonic welded to base cap 14, although the use of adhesives, heat, and threaded attachment means may also be envisioned for achieving fixed attachment between the two components. Other main components include the indicator/lock pin 20, the diaphragm 22, the reset cover 24 and the reset button 26. A label liner 28 having delineations 30 is positioned within housing 12. As indicator cup 18 changes position, as shall be shown, its position relative to delineations 30 indicates the condition of the fuel filter that is being monitored. As shown in FIG. 4, housing 12 preferably includes a female thread portion 13 for threaded engagement with a fitting connecting fuel filter gauge 10 to fuel line L. Threaded portion 13 is preferably a ½-20 UNF thread, which is very robust and difficult to strip.

Referring to FIG. 4, indicator cup 18 preferably includes a guide stem 32 that is slidably received within housing guide bore 34. Guide stem 32 includes an angled or rounded tip 36 that aids entry into guide bore 34 of housing 12. Guide stem 32 helps prevent tilt of indicator cup 18 and the potential for lockpin 20 to become disengaged from base cap 14, as shall be seen. Indicator cup 18 preferably also includes a shoulder 38 that contacts the end of housing guide bore 34 to limit movement of indicator cup 18. Calibration spring 16 bears against the end surface 15 of housing 12 on one end, and against indicator cup 18 on the other. Calibration spring 16 preferably bears against the calibration spring seat 40 of indicator cup 18. The outer edge 42 of indicator cup 18 is positioned with respect to delineations 30 of label liner 28 to give a clear, visual indication of the condition of the fuel filter being monitored, by indicating the vacuum level of fuel line L.

Diaphragm 22 includes inner and outer bead seals 44, 46, respectively, for retaining diaphragm 22 in position. Inner bead seal 44 is positioned between indicator cup 18 and lockpin 20, and outer bead seal 46 is positioned between housing 12 and base cap 14. Additionally, base cap 14 also includes a diaphragm antireversal wall 47, which supports the underside of diaphragm 22 when indicator cup 18 is in the lower, reset position indicated in FIG. 4. This configuration results in diaphragm 22 being supported on all surfaces during back pressure, minimizing failure due to reversal. Diaphragm 22 is preferably made of cloth lined flourosilicon to control durometer throughout the temperature range, to handle fuels and other chemicals, and to minimize cuts.

Figure 5:
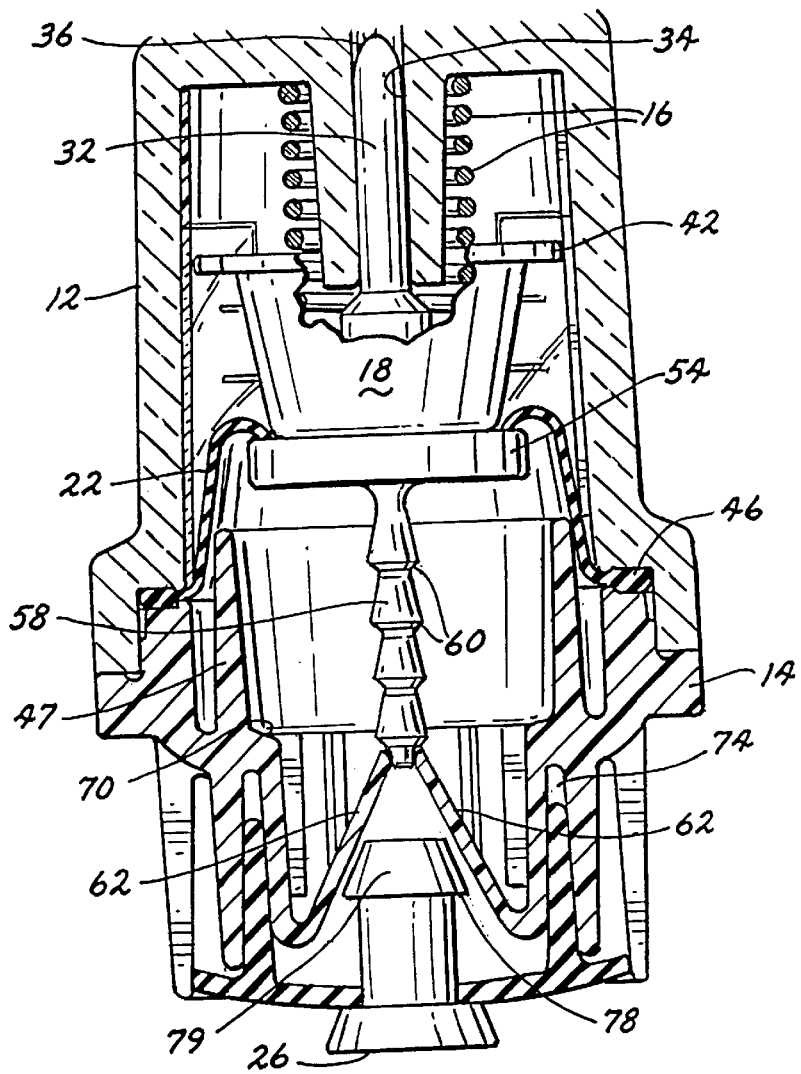
FIG. 5 is a partial section view similar to FIG. 4, showing the lockpin and lock fingers in the locking position.
Figure 7:
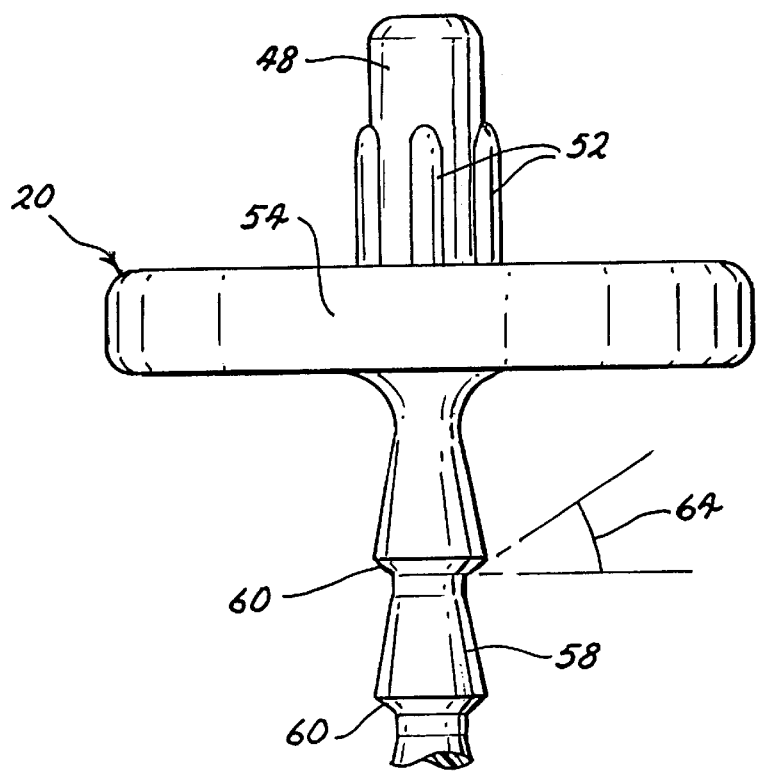
FIG. 7 is a detailed partial side view of the lockpin.
Figure 8:
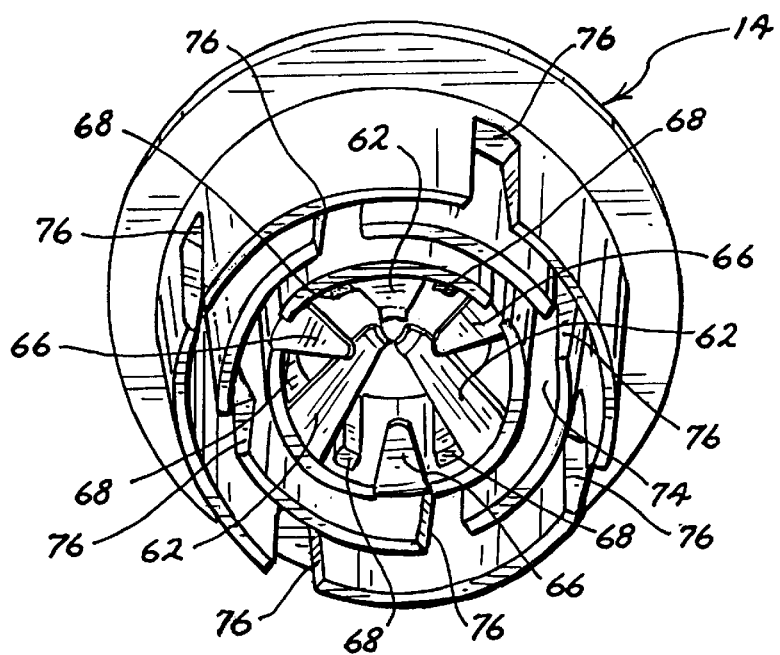
FIG. 8 is a bottom perspective view of the base cap.

Of particular interest is lockpin 20, as shown in FIGS. 4, 5 and 7. Lockpin 20 includes a retention stem 48 for retaining indicator cup 18. Retention stem 48 frictionally engages indicator bore 50 of indicator cup 18. Retention stem 48 preferably includes retention ribs 52 to ensure a secure fit between lockpin 20 and indicator cup 18. Lockpin 20 also preferably includes an integral lock ring 54 to help retain diaphragm 22 in proper position with respect to housing 12 and indicator cup 18. It is preferred that lock ring 54 include a raised, rounded circumferential edge 56, as best shown in FIG. 4. Rounded edge 56 helps prevent cutting into diaphragm 22 when indicator cup 18 is in the fully extended, upper lock position, as shown in FIG. 5, and provides anti-reversal support for diaphragm 22 when back pressure is being applied to gauge 10.

Of particular significance on lockpin 20 is lock stem 58. Lock stem 58 preferably is configured with several angled stops 60 for engagement with lock fingers 62 of base cap 14. The latch angle 64, as shown in FIG. 7, may vary depending on the design criteria specified for specific applications of fuel filter gauge 10. A relatively large latch angle 64 allows lock fingers 62 to slip off latch stops 60 when excessive force is applied to indicator cup 18. A relatively shallow latch angle 64 makes the latching mechanism resist slippage when high forces are applied to indicator cup 18. It is preferable that angle 64 fall within the range of approximately 22.5° to approximately 30°. The use of a relatively large latch angle 64 may be significant in the situation when, for example, a dirty fuel filter F1 is replaced with a new fuel filter F1, and the service technician forgets to reset fuel filter gauge 10, as shall be discussed. With a relatively large latch angle 64, gauge 10 would then auto reset when sufficient backpressure is applied and yet operate normally holding peak vacuum levels as fuel filter F1 again becomes plugged. It is the purpose of angled stops 60 to permit indicator cup 18 to snap back to the initial, reset position shown in FIG. 4 without having to use reset button 26 when high backpressure puts excessive load on lock fingers 62 to prevent breakage of lock fingers 62.

Base cap 14, as illustrated in FIGS. 4–6 and 8, preferably includes three lock fingers 62 molded therein. Base cap 4 also preferably includes three push button retention fingers 66 for maintaining the position of reset button 26. Reinforcing ribs 68 preferably spaced between lock fingers 62 and pushbutton retention fingers 66 provide additional support for indicator support shoulder 70, against which lock ring 54 bears during backpressure. As may be seen in FIGS. 4–6, reset cover 24 includes a peripheral engagement member 72 for frictional engagement with a corresponding engagement channel 74 formed in base cap 14. Base cap 14 also preferably includes flow ports 76 staggered throughout to form an integral, molded-in labyrinth filter. This labyrinth filter serves to prevent water and dirt from entering the region of lockpin 20, lock fingers 62, and diaphragm 22. Under normal operating conditions, water and dirt can enter this region around reset spring 24 and reset button 26.

However, water is undesirable because it may freeze the mechanism in the winter, and dirt may result in abrasion and ensuing damage to the mechanism. The geometry of flow ports 76 results in dirt being trapped within the labyrinth, and water being expunged therefrom, regardless of the orientation of fuel filter gauge 10. The labyrinth seal eliminates the need for a felt filter as used in the prior art, which if even slightly improperly positioned could result in admission of damaging dirt and water directly into the indicating mechanism, and allows the reset button to be mounted in an upward position without leakage.

Figure 6:
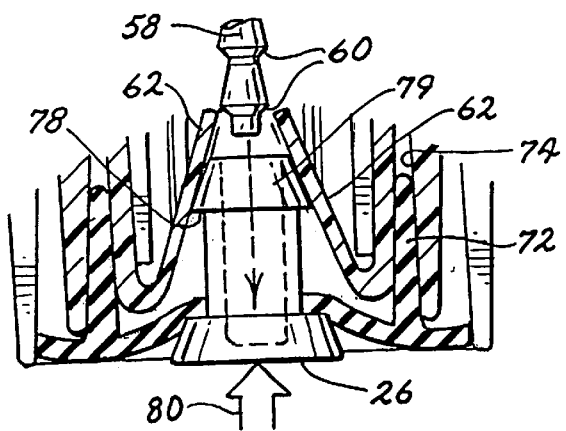
FIG. 6 is a partial section view similar to FIG. 5, showing the interaction between the lockpin, lock fingers and the reset push-button.

Reset pushbutton 26 extends through and projects from reset cover 24, as shown in FIGS. 2, 5 and 6. Reset button 26 overlies and surrounds a substantial portion of lock stem 58 of lockpin 20, and includes a circumferential rib 78 for engagement with pushbutton retention fingers 66 of base cap 14. Reset button 26 also includes an angled face 79 for engagement with lock fingers 62 of base cap 14.

In use, fuel filter gauges 10 are installed as shown in FIG. 1. With a clean fuel filter F1, F2, the position of indicator cup 18 is as shown in FIG. 4. As the fuel filter F1, F2 with which fuel filter gauge 10 is associated becomes clogged with contaminants, a vacuum is formed that gradually overcomes the force of calibration spring 16. As calibration spring 16 compresses, indicator cup 18 is drawn towards the end of housing 12 having threaded portion 13, until it reaches the position shown in FIG. 5. As indicator cup 18 is drawn towards the position shown in FIG. 5, it is retained in intermittent positions by engagement of base cap lock fingers 62 with angled lock stem stops 60 of lock stem 58. Thus, when the vehicle engine is turned off, gauge 10 continues to indicate the condition of fuel filter F1, F2 by the position of indicator cup outer edge 42 relative to delineations 30 of label liner 28. Preferably, when indicator cup 18 reaches the position indicated in FIG. 5, label liner 28 clearly indicates that it is time for fuel filter F1, F2 to be replaced.

Once a dirty fuel filter F1, F2 has been replaced, fuel filter gauge 10 may be reset very simply by pressing reset button 26 in the direction of arrow 80 of FIG. 6. Upon depressing reset button 26, angled face 79 thereof engages and forces aside lock fingers 62, previously engaged with lock stem stops 60, permitting calibration spring 16 to bias lockpin 20 toward reset cover 24, resulting in lock ring 54 bearing against indicator support shoulder 70, as generally shown in FIG. 4.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A fuel filter gauge for indicating a condition of a fuel filter cooperating with a fuel system of an internal combustion engine of a motorized vehicle, the fuel filter gauge comprising:

a housing having an aperture fluidly engaging the fuel system of the motorized vehicle, said housing also including an end surface having an inner side;

an indicator cup within said housing for indicating the condition of the fuel filter, said indicator cup being positionable between a first position and a second position;

a base cap assembly fixedly engageable with said housing, said base cap assembly including a plurality of generally inwardly projecting lock fingers;

a lockpin engageable with said base cap assembly and said indicator cup, said lockpin including a lock stem and a plurality of lock stem stops integral with said lock stem, said lock stem stops being releasably engageable with said lock fingers of said base cap assembly;

a diaphragm positioned between said lockpin and said indicator cup; and a calibration spring bearing against said inner side of said housing on one end and against said indicator cup on another end, said calibration spring biasing said indicator cup toward said first position.

2. The fuel filter gauge described in claim 1, further comprising: a reset button engageable with said lock stem of said lockpin and said lock fingers of said base cap assembly, whereby actuation of said reset button results in disengagement of said lock fingers from said lock stem stops of said lock stem.

3. The fuel filter gauge described in claim 2, wherein: said lock stem stops extend at an angle from said lock stem, said angle being in the range of between 22.5° and 30° from horizontal; and said lock fingers of said base cap assembly extend inwardly at an angle generally perpendicular to said lock stem stops.

4. The fuel filter gauge described in claim 3, wherein:

said reset button includes a distal end having a circumferential angled face for engagement with said lock fingers of said base cap for disengaging said lock fingers from said lock stem stops of said lockpin lock stem.

5. The fuel filter gauge described in claim 1, further comprising:

an elongate guide bore projecting inwardly from said end surface of said housing; and a guide stem slidably extending into said guide bore from said indicator cup.

6. The fuel filter gauge described in claim 5, wherein:

said guide stem includes an angled tip, whereby said angled tip assists proper positioning of said guide stem within said guide bore.

7. The fuel filter gauge described in claim 1, wherein:

said base cap assembly further includes a peripheral wall projecting outwardly toward said end surface of said housing, whereby said peripheral wall prevents the reversal of said diaphragm when said indicator cup is in said first position.

8. The fuel filter gauge described in claim 2, further comprising:

a reset spring for maintaining said reset button in position, said reset spring being engageable with said base cap assembly.

9. The fuel filter gauge described in claim 1, wherein:

said base cap assembly further comprises flow ports.

10. The fuel filter gauge described in claim 1, wherein:

said lockpin further comprises a retention stem for frictional engagement with said indicator cup, for maintaining the position of said lockpin relative to said indicator cup.

11. The fuel filter gauge described in claim 1, wherein:

said lockpin further comprises a lock ring to retain said diaphragm in proper position with respect to said housing and said indicator cup.

12. The fuel filter gauge described in claim 11, wherein:

said base cap assembly further comprises a support shoulder for limiting the movement of said lockpin, said lock ring bearing against said support shoulder when said indicator cup is in said first position.

\* \* \* \* \*

UNITED STATES PATENT AND TRADEMARK OFFICE
CERTIFICATE OF CORRECTION

PATENT NO.    : 6,289,726 B1                              Page 1 of 1
DATED         : September 18, 2001
INVENTOR(S)   : Gregory M. Ferris et al.

It is certified that error appears in the above-identified patent and that said Letters Patent is hereby corrected as shown below:

<u>Title page,</u>
Item [75], Inventors, delete "Charels Henry Berry, III" and insert -- Charles Henry Berry, III --

Signed and Sealed this

Seventh Day of May, 2002

Attest:

Attesting Officer

JAMES E. ROGAN
*Director of the United States Patent and Trademark Office*